(No Model.)
J. W. TILLYER.
WHIP SOCKET CLAMP.
No. 260,507. Patented July 4, 1882.
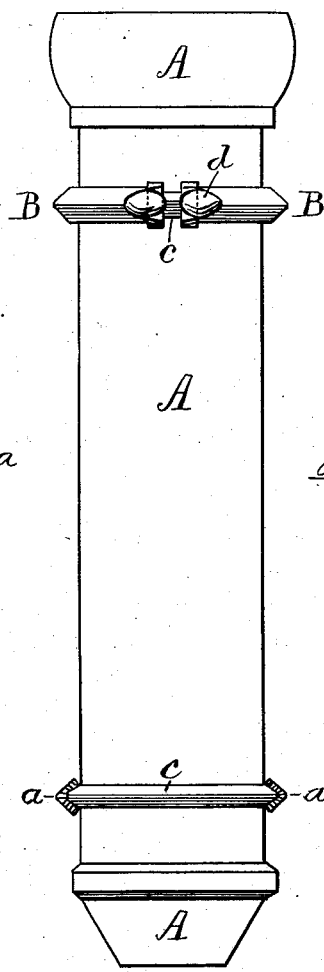
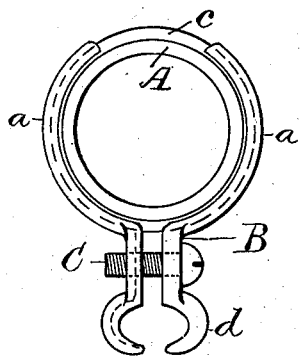
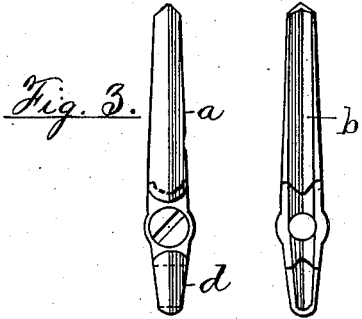
Attest:
H. W. Humphrey
Walter M. Conger Jr.
Inventor.
J. W. Tillyer, per
Thos. S. Crane, Atty.

UNITED STATES PATENT OFFICE.

JAMES W. TILLYER, OF NEWARK, NEW JERSEY.

WHIP-SOCKET CLAMP.

SPECIFICATION forming part of Letters Patent No. 260,507, dated July 4, 1882.

Application filed March 3, 1882. (No model.)

*To all whom it may concern:*

Be it known that I, JAMES W. TILLYER, a citizen of the United States, residing in the city of Newark, Essex county, New Jersey, have invented certain new and useful Improvements in Whip-Socket Clamps, fully described and represented in the following specification and the accompanying drawings, forming a part of the same.

My invention relates to an improvement in whip-socket clamps; and it consists in the construction herein described and claimed, the same being a new form of the clamp known as the "Chamberlain clamp," patented August 23, 1864, and September 6, 1870, and devised by me to prevent the clamp from slipping out of its proper position upon the socket.

In the drawings annexed, Figure 1 is a side view of a whip-socket provided with two beads for the guiding of the clamp, a rear view of one clamp being shown upon the upper bead and a section of another clamp being shown upon the lower bead. Fig. 2 is a plan of the clamp with a section of the whip-socket therein, and Fig. 3 is an edge view of the clamp alone. Fig. 4 is an inside view of one-half of the clamp, showing the continuation of the clamping-groove into the rear hooks for the purpose of lightening the same.

Clamps of the same general appearance as those illustrated are in common use, but are not employed in combination with a bead upon the whip-socket, and are therefore incapable of retaining their position securely when pinched against the socket by the clamping-screw.

My improvement consists in combining with the clamp and socket a bead and groove adapted to prevent the displacement of the clamp when secured upon the socket, and will be understood by reference to the figures.

A is the whip-socket, which may be made of any material or pattern if constructed to co-operate with the clamp, as described.

B is the clamp, having two halves of similar shape, adapted to fit upon the socket and dash-board, and held or pressed together by a screw, C.

The parts in contact with the socket are lettered *a*, and are shown formed with a groove or channel, *b*, upon their inside, to fit upon a bead, *c*, upon the body of the socket A.

In Fig. 1, and at the right-hand side of Fig. 2, the groove is shown extended merely to the center line of the clamps, but upon the left-hand side of Fig. 2, and in the inside view in Fig. 4, the groove is shown extending all the way to the ends of the hooks *d*.

As shown at the lower bead in Fig. 1, the groove in the clamps at *a* fits snugly upon the bead and prevents the clamp from any displacement or slipping about, as is common with those heretofore used.

If extended to the ends of the hooks at *d*, the groove serves merely to lighten the castings, and, owing to the convex shape of their exterior, does so without any sacrifice of needed strength.

As the object intended by my invention is to prevent the twisting and slipping about of the clamps upon the socket, it is obvious that it could be attained by fitting a clamp in between two beads or annular ridges upon the socket and omitting the groove *b* from its inside. It is therefore immaterial whether the groove be formed upon the clamp and the bead upon the socket, or the contrary; but as the clamp has been long in use without the special means I have used for steadying it upon the socket, I distinctly disclaim it except in the special construction herein shown and described. And as the clamp is usually made and sold apart from the socket, I do not limit myself solely to the combination of the two, but consider the grooved clamp itself as an invention fitted to use with any socket having a suitable bead formed thereon.

I therefore claim my invention as follows:

1. In combination with the whip-socket A and clamp B, a bead and groove adapted to prevent the displacement of the clamp upon the socket, substantially as shown and described.

2. As a new article of manufacture, the clamp formed with groove or channel *b* upon the inside, substantially as shown and described.

In testimony whereof I have hereunto set my hand in the presence of two subscribing witnesses.

JAMES W. TILLYER.

Witnesses:
THOS. S. CRANE,
W. F. D. CRANE.